May 14, 1963 F. W. MOUNTS 3,090,008

PREDICTIVE QUANTIZATION AND CODING OF VISION SIGNALS

Filed Oct. 24, 1960 2 Sheets-Sheet 1

INVENTOR
F. W. MOUNTS
BY Harry C. Hart
ATTORNEY

May 14, 1963 F. W. MOUNTS 3,090,008

PREDICTIVE QUANTIZATION AND CODING OF VISION SIGNALS

Filed Oct. 24, 1960 2 Sheets-Sheet 2

INVENTOR
F. W. MOUNTS
BY
Harry C. Hart
ATTORNEY 3,090,008

PREDICTIVE QUANTIZATION AND CODING OF VISION SIGNALS

Frank W. Mounts, Murray Hill, N.J., assignor to Bell Telephone Laboratories, Incorporated, New York, N.Y., a corporation of New York Filed Oct. 24, 1960, Ser. No. 64,524
6 Claims. (Cl. 325—44)

Figure 1:
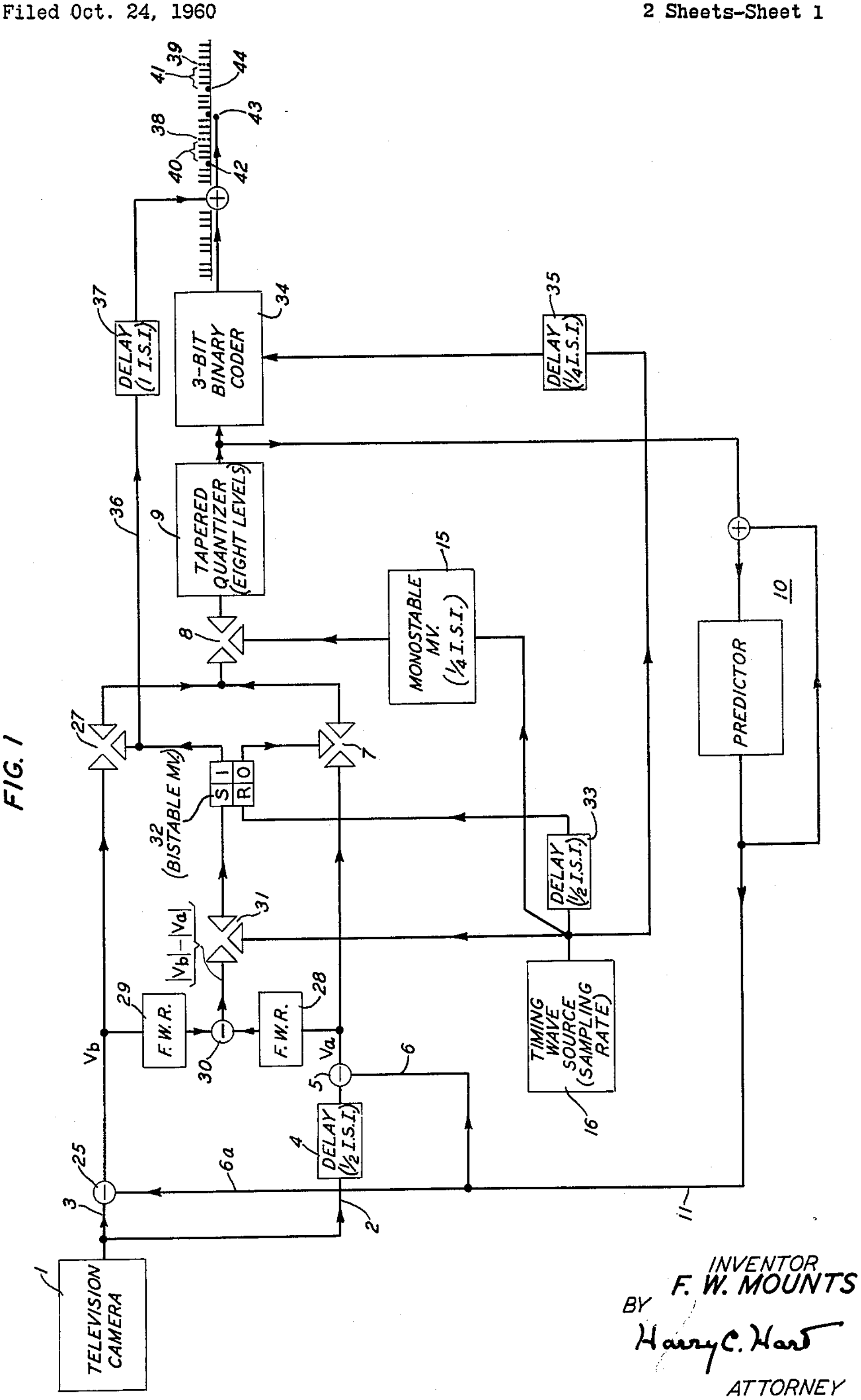

This invention deals with the coding of vision signals. It has for its principal object to code vision signals in a way that makes for substantial improvement of the quality of the reconstructed image without an offsetting increase in the complexity of the code and hence of the frequency bandwidth required of the transmission channel to carry it.

In contrast to a sound wave, a vision signal wave derived from a field of view such as a scene, indoor or outdoor, or from printed material such as a text or a map, is normally characterized by abrupt transitions in light value separated by portions having no such transitions. While, from the standpoint of the pickup apparatus, the transitions occur at random locations, they are for the most part separated by transistionless portions of the wave of considerable extent.

Many proposals have been made to turn these common characteristics of vision signals to account in the reduction of the band of frequencies required to transmit them. One such proposal involves predictive quantization and the coding of signal differentials. It is described in a monograph of R. E. Graham, published in the WESCON Convention Record of the Institute of Radio Engineers for 1958, part 4, page 147, and forms a part of the subject matter of an application of R. E. Graham, Serial No. 734,338, filed May 9, 1958, now matured into Patent No. 3,026,375, granted March 20, 1962. According to this proposal, the initial operation to which the incoming vision signal is subjected is to subtract from it a "predicted" value, the prediction being based on the past behavior of the signal. The quantization and prediction operations are carried out in a feedback loop of which the first element is a substractor, and it is the output of this subtractor that is quantized. From the quantized counterpart, the predicted value is generated and the latter is fed back to the subtractor. At the output terminal of the feedback loop, therefore, there appear successive quantized difference signals, each of which represents the difference between the present value of the signal and its predicted value, and these lend themselves readily to translation into an economical code; for example, the natural binary code, for transmission.

The quantization and coding operations require a sampling operation. Thus samples are advantageously taken of the difference signal before it is applied to the quantizer. Unless further complexities such as elastic storage are to be resorted to, the sampling operation is normally carried out at each of a set of discrete sampling instants that recur regularly on the time scale, each being separated from its predecessor by an intersample interval. Considerations of image quality dictate that the intersample intervals be exceedingly short, while considerations of bandwidth economy dictate that they be as long as possible without undue degradation of the quality of the reproduced image. As a compromise, it has been usual to select the length of the intersample interval in the light of the characteristics of a vision signal derived from an average picture or scene. As a consequence of this compromise, an abrupt transition that occurs after any specified sampling instant cannot be picked up before the next sampling instant and this delay, which may in principle amount to nearly an entire sampling interval, results in degradation of the reproduced image. This degradation is especially objectionable in the reproduction of a contour that slopes across the scene.

It is a particular object of the present invention to effect a substantial reduction in the degradation of a reproduced image that arises from these causes at the price of only a small increase in the complexity of the code counterpart of the quantized difference signal and of the apparatus that generates it.

In accordance with the invention, each intersample interval is subdivided, though not for sampling purposes, into a plurality of subintervals; and these subintervals are monitored to determine, for each abrupt transition in the signal wave, which of these subintervals contains the transition. In addition, if there should be more than one transistion in the intersample interval, the apparatus picks the most significant one, identifies the subinterval which contains it and disregards the other transitions. A code is generated that represents the subinterval containing the only transition, or the most significant transition of two or more, and this code is transmitted, along with the code counterpart of the quantized difference signal, to the receiver station. At the receiver station, the code counterpart of the quantized difference signal is decoded in the usual way to produce a brightness transition signal while, simultaneously, the code counterpart of the subinterval-defining signal is utilized in the reproducer, to locate this transition at the correct point of the viewing screen. As a result, the location of the transition is rendered more precise than was possible heretofore by a factor equal to the number of subintervals into which each intersample interval is subdivided, while the coded information which it is required to generate, to transmit and to decode is increased only in proportion to the logarithm, to the base 2, of the number of subintervals.

Figure 2:
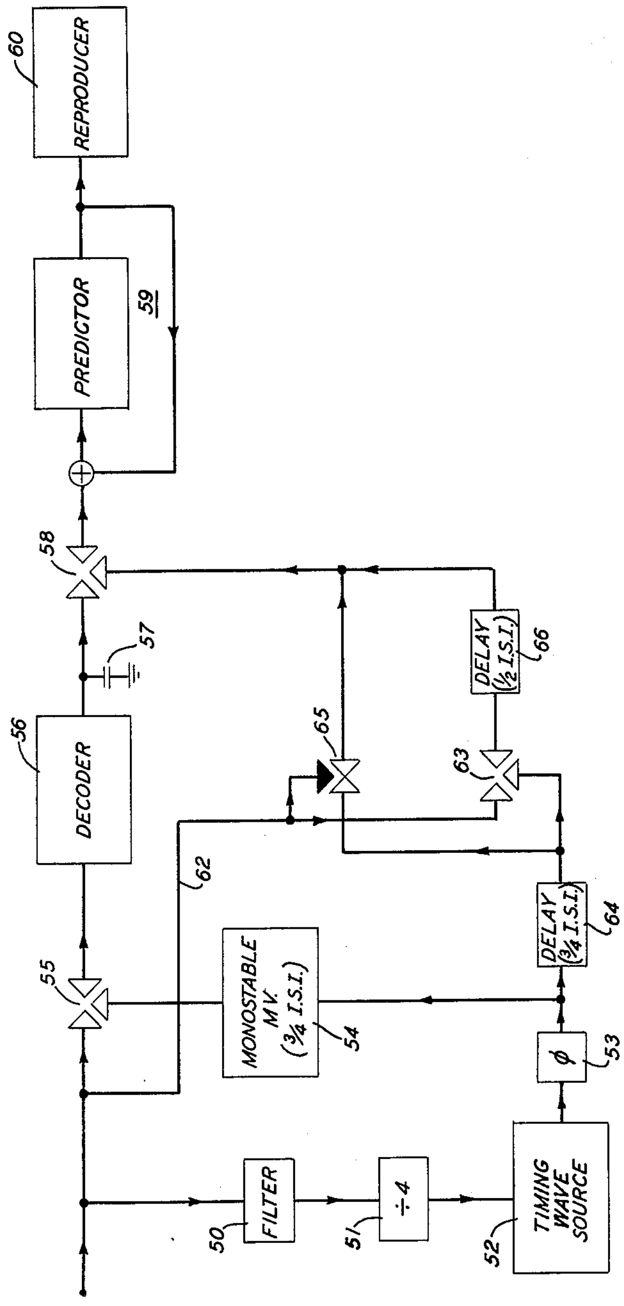

The invention will be fully apprehended from the following description of an illustrative embodiment, in which the number of subintervals is two, taken in connection with the appended drawings in which:

FIG. 1 is a schematic circuit diagram showing transmitter apparatus embodying the invention; and FIG. 2 is a schematic diagram showing receiver apparatus embodying the invention.

These figures are not actual circuit diagrams. Rather, each of them is a single line layout, each line indicating a transmission path or a control path. The system requires a number of switching or gating operations. The apparatus for performing these operations is shown, in most cases, by a group of three arrowheads arranged in one or another of two different ways. In each case the two arrowheads that point toward each other define a transmission path to be established or disestablished by a control signal applied to a third arrowhead shown pointing toward the first two arrowheads. When the path is normally disestablished, to be established by a control signal, the first two arrowheads are shown spaced apart and the third control arrowhead is shown in outline. When, to the contrary, the transmission path is normally established, to be disestablished by a control signal, the first two arrowheads are shown in mutual contact and the third arrowhead is shown in solid black.

The transmission through each of these switches or gates is unidirectional, as indicated by arrowheads on the associated conductors themselves. Backward transmission through any of these switches can be prevented by employment of an isolating amplifier, a buffer or the like in well known fashion. In the interests of simplicity of illustration, such isolating amplifiers or buffers have been omitted from the drawings.

Referring now to FIG. 1, a vision signal, typically derived from a television camera 1, is applied in parallel to a first (lower) path 2 and to a second (upper) path 3. Referring first to the lower path 2, the signal in this path is first retarded, by a delay device 4, by one half intersample interval (abbreviated I.S.I.) for a reason to be explained below. It is then applied to one input point of a subtractor 5 in which a feedback signal, developed as described below and appearing on a conductor 6, is subtracted from it to leave a residue whose magnitude is designated $V_a$. This residue is applied to one conduction terminal of a routing switch 7 that is actuated, once for each sampling interval, by a control signal applied to its control terminal. The resulting difference signal that appears on the output conduction terminal of the routing switch 7 is applied, through a sampling switch 8, to a multilevel quantizer 9, preferably one having a tapered quantizing scale. Like the routing switch 7, the sampling switch 8 is actuated once for each sampling interval. The quantized signals that appear at the output terminal of the quantizer 9 are supplied to a feedback predictor 10, which may be identical with that described in the Graham monograph, and the resulting predicted values are applied by way of a feedback path 11, 6, to the second input point of the subtractor 5, thus to form the difference signal $V_a$. The sampling operation carried out by the switch 8 is controlled by a monostable multivibrator 15 that delivers an actuating pulse, for example, of ¼ I.S.I. duration, once for each intersample interval. It is actuated by a timing wave source 16 that delivers clock pulses at the sampling rate.

Thus far, and aside from the delay device 4 and the routing switch 7, the performance of the apparatus is the same as that described in the Graham monograph referred to above. The present invention extends the system of that monograph in the fashion now to be described.

The vision signal is also applied directly, that is, without retardation, to one input point of a subtractor 25 in the upper path 3. The same feedback signal, developed as described above and appearing on the feedback conductor 11, is applied by way of a branch conductor 6*a* to the second input point of this subtractor 25 so that the latter unit delivers a difference signal designated $V_b$. Because of the delay introduced into the first path by the delay device 4, the signal $V_b$ *represents* a slightly later part of the scene than does the signal $V_a$, though it *occurs,* and is available for processing, at the same instant. In general, $V_b$ may differ from $V_a$, although in many cases they may have identical magnitudes. The difference signal $V_b$ is now passed through a routing switch 27 that may be identical with the routing switch 7 and similarly actuated but, this time, at an instant lying half way between the instants of two successive actuation instants of the routing switch 7, and then only when certain conditions, to be described, are met.

The control apparatus that determines the operations of the two routing switches 7, 27, may advantageously comprise a first full wave rectifier 28 that delivers a signal $|V_a|$ representing the magnitude of the signal $V_a$ and independent of its sign or polarity, a second full wave rectifier 29 that similarly delivers a signal $|V_b|$, and a subtractor 30 that forms a difference signal $|V_b|-|V_a|$. This difference signal is applied to one conduction terminal of a selector switch 31 that is actuated by the pulse output of the timing wave source 16.

The absolute magnitude signal $|V_b|-|V_a|$ passed by this selector switch 31 is applied to one input point of a bistable multivibrator 32 as a Set signal to drive it into the second one of its two stable states, here designated as that in which an actuating signal ("1") appears on its upper output point, but no signal ("0") appears at its lower output point. Under the condition that $|V_b|$ does not exceed $|V_a|$ the difference signal is zero or negative at the instant of arrival of a pulse from the timing wave source 16, it fails to actuate the multivibrator 32, and the latter fails to actuate the upper routing switch 27. After a delay of ½ I.S.I. introduced by a delay device 33, the sampling pulse from the source 16 is applied as a Reset signal to the multivibrator 32, thus to drive it into, or hold it in, its first stable state, in which its lower output terminal delivers an actuating signal ("1"), while its upper output terminal delivers no output signal. The output of the multivibrator 32 then actuates the lower routing switch 7, thus to pass the signal $V_a$. When, to the contrary $|V_b|$ is greater than $|V_a|$, the multivibrator 32 is driven into its second stable state, which endures until the arrival of a reset pulse, after ½ I.S.I., and the multivibrator output actuates the upper routing switch 27, thus to pass the signal $V_b$.

The difference signal thus passed by one or the other of the two routing switches 7, 27, is next sampled by the sampling switch 8 that is actuated, regularly and once for each intersample interval, in the fashion described above. This difference signal sample is quantized, a predicted magnitude is generated by the predictor, and the latter is fed back as described above to the subtractors 5, 25.

In operation, if a transition in the brightness of the scene being transmitted occurs in the first half of the intersample interval, and if it is not overpowered by a more significant transition occurring in the second half, $V_a$ is equal to or greater than $V_b$ at the sampling instant. In this event the output of the subtractor 30 is zero or negative and the signal passed by the selector switch 31 fails to qualify as a Set signal for the multivibrator 32. The multivibrator thus remains in its first or Reset state and the differential signal $V_a$ is passed to the sampling switch 8 by the routing switch 7 while the differential signal $V_b$ is blocked by the routing switch 27. If, to the contrary, the more significant brightness transition occurs in the second half of the intersample interval, the output of the subtractor 30 is positive and, when the selector switch 31 is actuated by the output of the timing wave source 16, this output is passed to the multivibrator 32 as a Set signal that actuates the routing switch 27 to pass the differential signal $V_b$ to the sampling switch 8, while the routing switch 7 blocks the differential signal $V_a$. As above indicated, the signal thus passed by the sampling switch 8, $V_a$ or $V_b$ as the case may be is next quantized, a predicted magnitude is generated from the output of the quantizer, and the latter is fed back to the subtractors 5, 25 as described above. At the same time, the output of the quantizer 9 is coded for transmission by a coder 34 which may be actuated, once for each intersample interval, by a pulse of the timing wave source 16 which, in order that it may become available at the proper moment, may be retarded by one quarter of an intersample interval as by a delay device 35 to compensate for the delay introduced by the monostable vibrator 15.

Given the characteristics of usual vision signals it has been found that, in a predictive quantized difference transmission system such as that of the Graham monograph, eight distinct quantum levels, four positive and four negative, suffice when the quantization scale is appropriately tapered; i.e., tapered in the fashion there described. Eight distinct quantum levels can be uniquely coded with the various possible permutations of three binary code elements or pulses. Accordingly, the output of the tapered quantizer 9 is applied to a 3-bit binary coder 34 which may be of conventional type, constructed to deliver, for each quantized sample applied to it, a permutation code group of three two-valued pulses, each group being separated from its successor by a guard space, preferably of a single pulse period duration.

In accordance with the invention these code pulse groups, that represent the magnitudes of the successive quantized differences, are supplemented by a code that indicates, for each transition, whether it occurs in the first half of the intersample interval or in the second half. This is conveniently arranged by interpolating a single information bit in the guard space preceding or following the transition code pulse group. It may be derived in any unequivocal fashion from the control apparatus described above; for example, through a conductor 36 connected to the upper output terminal of the multivibrator 32. It may be brought into time coincidence with the guard space following the transition-defining code pulse group by a delay device 37. Thus, an On pulse 38 or 39 introduced immediately following a transition-designating code pulse group 40 or 41 signifies that the code pulse group immediately preceding it was derived from the upper path, represents a quantized sample of the signal $V_b$, and, hence, a transition in the second half of the intersample interval. Similarly, an Off pulse 42, 43 or 44 interposed in a similar guard space signifies that the preceding code pulse group represents a quantized sample of the signal $V_a$, and, hence, a transition that occurs in the first half of the intersample interval.

After transmission to a receiver station, shown in block diagram form in FIG. 2, each pulse group of the incoming train is first subdivided into a position-indicating pulse and a transition-defining code pulse group. To this end a filter 50 of well known construction picks off a wave having the frequency of the basic pulse repetition rate. The frequency of the resulting wave is divided by four by a divider 51 to recover a train of pulses having the frequency of the sampling rate at the transmitter station. This pulse train serves in well known fashion to control a timing wave source 52 and the output of this unit is brought into proper phase relation to control the operations as required by a phase shifter 53.

The output of the phase shifter 53 trips a monostable multivibrator 54 so constructed as to deliver on its output terminal a signal that endures for ¾ I.S.I. This signal actuates a switch 55 which admits to a decoder 56 the first 3 pulses of each incoming code pulse group and blocks the fourth one. The output of the decoder 56 is held on a condenser 57 until a sampling switch is actuated as described below, whereupon it is modified by a feedback predictor 59, identical with the predictor 10 at the transmitter station, and the output of the predictor 59 is applied to an image reproducer 60.

Assuming that a differential signal under consideration represents a transition occurring in the first half of the intersample interval, the code pulse group representing it is followed by a space or Off pulse, indicating that this transistion should be reconstructed on the image viewing screen of the reproducer 60 in a location corresponding to the first half of the intersample interval. The entire code pulse train is led by a conductor 62 to one conduction terminal of a switch 63 of which the control terminal is actuated by the output of the timing wave source 52, retarded by ¾ I.S.I. by a delay device 64. Thus the first three pulses of each group, whether they be On pulses or Off pulses, are blocked by the switch 63 while, when the switch is actuated by the retarded output of the timing wave source 52 the fourth pulse, under this condition an Off pulse, passes through the switch 63 and a delay device 66 to the control terminal of a sampling switch 58, but is insufficient to actuate the switch 58. Under the same condition the sampling pulse, retarded by the device 64 into coincidence with the marker Off pulse, is passed by a switch 65 and actuates the sampling gate 58 to admit the decoded counterpart of the preceding code pulse group to the predictor 59. The predicted brightness value is thus reconstructed forthwith by the reproducer 60.

When, to the contrary, the most significant transition occurs in the second half of the intersample interval, the code pulse group representing it is followed by an On pulse. This On pulse, applied to the control terminal of the switch 65, disestablishes the conduction path through this switch at the instant at which a sampling pulse reaches its conduction terminal from the delay device 64. The position-defining On pulse is also applied to one conduction terminal of the lower switch 63 which it reaches at precisely the instant at which a sampling pulse delayed by the device 64 reaches its control terminal from the source 52. It is thus passed by the switch 63 to the control terminal of the sampling switch 58 but only after a delay of ½ intersample interval, introduced by the delay device 66. The sampling switch 58 is thus actuated slightly later in the cycle than in the prior case, thus to apply the decoded counterpart of the transition-defining code pulse group to the predictor 59. The output of the latter is then applied to the reproducer 60 which reconstructs it at a location on the viewing screen that corresponds to the second half of the intersample interval.

As above indicated, the subdivision of each intersample interval into two subintervals is merely illustrative. It is within the spirit of the invention to subdivide each intersample interval into a greater number of subintervals, for example, into four subintervals, to monitor them in accordance with the program described above, to derive a supplementary indicating signal that identifies that one of each group of four subintervals that contains the most significant transition and to transmit this supplementary signal, along with the transition-defining signal, preferably as a binary pulse code group. Of course, the position-defining code pulse group will in this case require two bits of information. Similarly, for a subdivision into eight subintervals, the position-defining code pulse group requires three bits of information. In every case the precision of the reconstruction, for an intersample interval of given length, is improved by a factor equal to the number of subintervals into which the intersample interval is subdivided, while the additional coded information that it is required to transmit in order to take full advantage of this greater precision increases only in proportion to the logarithm to the base 2 of the number of subintervals.

What is claimed is:

1. In a communication system, means for scanning, at uniform speed, a message wave characterized by amplitude transitions, means for monitoring the successive elements of said wave in groups to identify, for each group, only the element that contains the most significant transition, means for developing a first signal representative of the magnitude of said most significant transition, means for developing a second signal representative solely of the identity of said wave element, means for transmitting said first and second signals to a receiver station and, at said receiver station, means for reconstituting a message wave from said first and second signals.

2. In a communication system, means for scanning, at a uniform speed, a message wave characterized by abrupt changes of character, means for monitoring the successive elements of said wave in mutually exclusive groups to identify, for each group, only the element that contains the most significant character change, means for developing, once for each element group, a first signal representative of the magnitude of said character change, means for also developing, once for each group, a second signal representative solely of the identity of said wave element, means for transmitting said first and second signals as a signal pair to a receiver station, and, at said receiver station, means for reconstituting successive wave character changes from the successive signal pairs.

3. In a communication system, means for scanning, at uniform speed, a message wave characterized by amplitude transitions, means for monitoring the successive elements of said wave in pairs to identify, for each pair, only the element that contains the most significant transition, means for developing a first difference signal representative of the magnitude of said most significant transition, a multilevel tapered quantizer for developing a quantized counterpart of said difference signal, means for converting said quantized counterparts into first permutation code groups of two-valued pulses, means for developing a second signal representative of the identity of said wave element, means for converting said second signals into two-valued indicator pulses, means for transmitting said code groups and said indicator pulses as a single train to a receiver station, and, at said receiver station, means for generating wave transition signals under control of said pulse groups, and reconstituting means for locating said generated transitions under control of said indicator pulses.

4. In a communication system, means for scanning, at uniform speed, a message wave characterized by amplitude transitions, means defining a sequence of sampling instants that recur regularly at equal intersample intervals, means for subdividing each of said intervals into a plurality of subintervals, means for monitoring said message wave to identify, for each sampling interval, only the subinterval in which the most significant transition occurs, means for sampling said wave at each of said sampling instants to develop first signals representative of the magnitudes of said most significant transitions, means for developing second signals representative of the identities of the subintervals in which said most significant transitions occur, means for transmitting said first and second signals to a receiver station, and, at said receiver station, means for developing wave elements from said received first signals, and means under control of said second signals for precisely locating said developed wave elements on the time scale.

5. In a system for the predictive differential quantization of vision signals originating in a vision signal source, two paths extending from said source, means for delaying the signal in the first path relatively to that in the second path by one half of the interval between successive regularly recurrent samples of said signal, means for individually subtracting, from the signal in each path, a predicted signal to derive, for each path, a residue, means for comparing the magnitudes of the residues in the two paths to derive a control signal indicative of the path carrying the greater of said residues, means for quantizing said greater residue and for converting it, as quantized, into a first order code pulse group, means for converting said control signal into a code element, means for combining said code element with said first order code pulse group to form, without additional pulses, a second order code pulse group, means for transmitting said second order code pulse groups to a receiver station and, at said receiver station, means for reconstituting an image from successive ones of said second order code pulse groups.

6. In a system for the predictive differential quantization of vision signals, means defining a sequence of sampling instants that recur regularly at equal intersample intervals, a source of a vision signal, a number $n$ of paths extending from said source, means for relatively delaying the signals in the several paths by $1/n$ of an intersample interval, means for individually subtracting, from the signal in each path, a prediction of the most probable next amplitude of the vision signal to derive, for each path, a residue signal, means for comparing the magnitudes of the residues in the several paths to derive a control signal indicative of the path carrying the greatest of said residues, means for quantizing said greatest residue and for converting it, as quantized, into a first order code pulse group, means for coding said control signal, means for combining said coded control signal with said first order code pulse group to form, without additional pulses, a second order code pulse group, means for transmitting said second order code pulse groups to a receiver station and, at said receiver station, means for reconstituting an image from successive ones of said second order code pulse groups.

References Cited in the file of this patent

UNITED STATES PATENTS

| | | |
|---|---|---|
| 2,516,587 | Peterson | July 25, 1950 |
| 2,636,081 | Feldman | Apr. 21, 1953 |
| 2,732,424 | Oliver | Jan. 24, 1956 |
| 2,946,851 | Kretzmer | July 26, 1960 |
| 2,978,535 | Brown | Apr. 4, 1961 |
| 3,026,375 | Braham | Mar. 20, 1962 |